US011987958B2

(12) United States Patent
(10) Patent No.: US 11,987,958 B2
(45) Date of Patent: May 21, 2024

Kondo et al.

(54) MULTI-CONTROL VALVE

(71) Applicant: KAWASAKI JUKOGYO KABUSHIKI KAISHA, Kobe (JP)

(72) Inventors: Akihiro Kondo, Kobe (JP); Yoshiyuki Tode, Kobe (JP); Hideyasu Muraoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/269,648

(22) PCT Filed: Dec. 27, 2021

(86) PCT No.: PCT/JP2021/048666

§ 371 (c)(1),
(2) Date: Jun. 26, 2023

(87) PCT Pub. No.: WO2022/172637

PCT Pub. Date: Aug. 18, 2022

(65) Prior Publication Data

US 2024/0052599 A1 Feb. 15, 2024

(30) Foreign Application Priority Data

Feb. 12, 2021 (JP) ................................ 2021-020556

(51) Int. Cl.
*F15B 11/024* (2006.01)
*E02F 9/22* (2006.01)
(Continued)

(52) U.S. Cl.
CPC .......... *E02F 9/2278* (2013.01); *E02F 9/2267* (2013.01); *F15B 11/024* (2013.01);
(Continued)

(58) Field of Classification Search
CPC ..... E02F 9/2278; E02F 9/2267; F15B 11/024; F15B 11/16; F15B 13/021; F15B 13/06;
(Continued)

(56) References Cited

U.S. PATENT DOCUMENTS 9,810,244 B2 * 11/2017 Kim ...................... E02F 9/2267
10,227,997 B2 * 3/2019 Hijikata ................ E02F 9/2203
(Continued)

FOREIGN PATENT DOCUMENTS

GB 2534518 A 7/2016
JP 2010-286074 A 12/2010
(Continued)

*Primary Examiner* — Dustin T Nguyen
(74) *Attorney, Agent, or Firm* — Oliff PLC

(57) ABSTRACT

A housing of a multi-control valve includes an arm parallel passage, an arm crowding supply passage, an arm pushing supply passage, a boom parallel passage, a boom raising supply passage, and a boom lowering supply passage. The housing further includes: a slide hole; a head-side passage that is branched off from the boom raising supply passage and extends to the slide hole; a rod-side passage that is branched off from the boom lowering supply passage and extends to the slide hole; and a regeneration passage that extends from the slide hole to the arm parallel passage. The slide hole receives a boom sub spool therein. The boom sub spool is either a boom recycling spool or a boom regeneration spool.

4 Claims, 5 Drawing Sheets

(51) Int. Cl.
*F15B 11/16* (2006.01)
*F15B 13/02* (2006.01)
*F15B 13/06* (2006.01)

(52) U.S. Cl.
CPC ............ *F15B 11/16* (2013.01); *F15B 13/021* (2013.01); *F15B 13/06* (2013.01); *F15B 2211/3058* (2013.01); *F15B 2211/327* (2013.01); *F15B 2211/329* (2013.01); *F15B 2211/45* (2013.01)

(58) Field of Classification Search
CPC ........ F15B 2211/3058; F15B 2211/327; F15B 2211/329; F15B 2211/45
See application file for complete search history.

(56) References Cited

U.S. PATENT DOCUMENTS

| | | | | |
|---|---|---|---|---|
| 10,280,594 | B2 * | 5/2019 | Hijikata | E02F 9/2271 |
| 10,787,790 | B2 * | 9/2020 | Imura | E02F 9/22 |
| 10,801,524 | B2 * | 10/2020 | Nakano | E02F 9/2285 |
| 2010/0031649 | A1 * | 2/2010 | Nakamura | E02F 9/2217 60/426 |
| 2019/0316611 | A1 | 10/2019 | Kondo et al. | |

FOREIGN PATENT DOCUMENTS

| | | | |
|---|---|---|---|
| JP | 2015-78713 | A | 4/2015 |
| JP | 2018-105333 | A | 7/2018 |

* cited by examiner

MULTI-CONTROL VALVE

CROSS-REFERENCE TO RELATED APPLICATIONS

This is a U.S. National Phase Application of PCT/JP2021/048666 filed on Dec. 27, 2021, which designates the United States and claims priority to Japanese Patent Application No. 2021-020556, filed on Feb. 12, 2021, the entire contents of which are incorporated herein by reference.

TECHNICAL FIELD

The present disclosure relates to a multi-control valve used in a hydraulic excavator.

BACKGROUND ART

Conventionally, a multi-control valve including multiple spools has been used in a hydraulic excavator (see Patent Literature 1, for example). The multi-control valve is connected to a hydraulic pump, a tank, and hydraulic actuators, and forms a hydraulic circuit together with them.

For example, in a hydraulic circuit in which hydraulic oil is supplied from one pump to, for example, a boom cylinder and an arm cylinder, the multi-control valve includes: a boom driving spool; an arm driving spool; and a housing that slidably holds the boom driving spool and the arm driving spool.

The boom driving spool opens and closes a boom parallel passage, a boom raising supply passage, and a boom lowering supply passage that are included in the housing. That is, as a result of shifting of the boom driving spool, the boom parallel passage that is branched off from a pump passage included in the housing is brought into communication with either the boom raising supply passage or the boom lowering supply passage.

The arm driving spool opens and closes an arm parallel passage, an arm crowding supply passage, and an arm pushing supply passage that are included in the housing. That is, as a result of shifting of the arm driving spool, the arm parallel passage that is branched off from the pump passage included in the housing is brought into communication with either the arm crowding supply passage or the arm pushing supply passage.

There is a case where the hydraulic circuit of a hydraulic excavator is configured such that when a boom lowering operation is performed (i.e., at boom lowering), hydraulic oil flowing through a boom raising supply line (i.e., hydraulic oil discharged from the head side of the boom cylinder) can be supplied to a boom lowering supply line (i.e., to the rod side of the boom cylinder) (i.e., such that boom recycling can be performed) (see Patent Literature 2, for example).

There is also a case where the hydraulic circuit of a hydraulic excavator is configured such that when a boom lowering operation and an arm operation are performed concurrently, hydraulic oil discharged from the head side of the boom cylinder can be supplied to the arm cylinder (i.e., such that boom regeneration can be performed) (see Patent Literature 3, for example).

CITATION LIST

Patent Literature

PTL 1: Japanese Laid-Open Patent Application Publication No. 2015-78713

PTL 2: Japanese Laid-Open Patent Application Publication No. 2010-286074

PTL 3: Japanese Laid-Open Patent Application Publication No. 2018-105333

SUMMARY OF INVENTION

Technical Problem

Conventionally, a multi-control valve used in a hydraulic circuit capable of boom recycling, and a multi-control valve used in a hydraulic circuit capable of boom regeneration, are completely different from each other. Therefore, in order to modify a hydraulic circuit capable of boom recycling into the one capable of boom regeneration, or conversely, in order to modify a hydraulic circuit capable of boom regeneration into the one capable of boom recycling, it has been necessary to replace the multi-control valve with a different one.

In view of the above, an object of the present disclosure is to provide a multi-control valve that is compatible with both a hydraulic circuit capable of boom recycling and a hydraulic circuit capable of boom regeneration, without requiring replacement of the multi-control valve, in particular, the housing of the multi-control valve.

Solution to Problem

In order to solve the above-described problems, a multi-control valve according to the present disclosure is a multi-control valve used in a hydraulic excavator, the multi-control valve including: an arm driving spool; a boom driving spool, a boom sub spool; and a housing that slidably holds the arm driving spool, the boom driving spool, and the boom sub spool. The housing includes: an arm parallel passage, an arm crowding supply passage, and an arm pushing supply passage that are opened and closed by the arm driving spool; a boom parallel passage, a boom raising supply passage, and a boom lowering supply passage that are opened and closed by the boom driving spool; a slide hole that receives the boom sub spool therein; a head-side passage that is branched off from the boom raising supply passage and extends to the slide hole; a rod-side passage that is branched off from the boom lowering supply passage and extends to the slide hole; and a regeneration passage that extends from the slide hole to the arm parallel passage. The boom sub spool is either a boom recycling spool or a boom regeneration spool. The boom recycling spool is a spool that shifts between a neutral position at which the boom recycling spool blocks between the head-side passage and the rod-side passage and a recycling position at which the boom recycling spool allows the head-side passage to communicate with the rod-side passage. The boom regeneration spool is a spool that shifts between a neutral position at which the boom regeneration spool blocks between the head-side passage and the regeneration passage and a regeneration position at which the boom regeneration spool allows the head-side passage to communicate with the regeneration passage.

The term “boom recycling” herein refers to supplying hydraulic oil discharged from the head side of a boom cylinder to the rod side of the boom cylinder when a boom lowering operation is performed, and the term “boom regeneration” herein refers to supplying the hydraulic oil discharged from the head side of the boom cylinder to an arm cylinder when a boom lowering operation and an arm operation are performed concurrently.

According to the above configuration, insertion of the boom recycling spool in the slide hole makes boom recycling possible, and insertion of the boom regeneration spool in the slide hole makes boom regeneration possible. Thus, compatibility with both a hydraulic circuit capable of boom recycling and a hydraulic circuit capable of boom regeneration can be realized without requiring replacement of the multi-control valve, but by replacing the boom sub spool without replacing the housing.

Advantageous Effects of Invention

The present disclosure provides a multi-control valve that is compatible with both a hydraulic circuit capable of boom recycling and a hydraulic circuit capable of boom regeneration, without requiring replacement of the multi-control valve.

DESCRIPTION OF EMBODIMENTS

Figure 1:
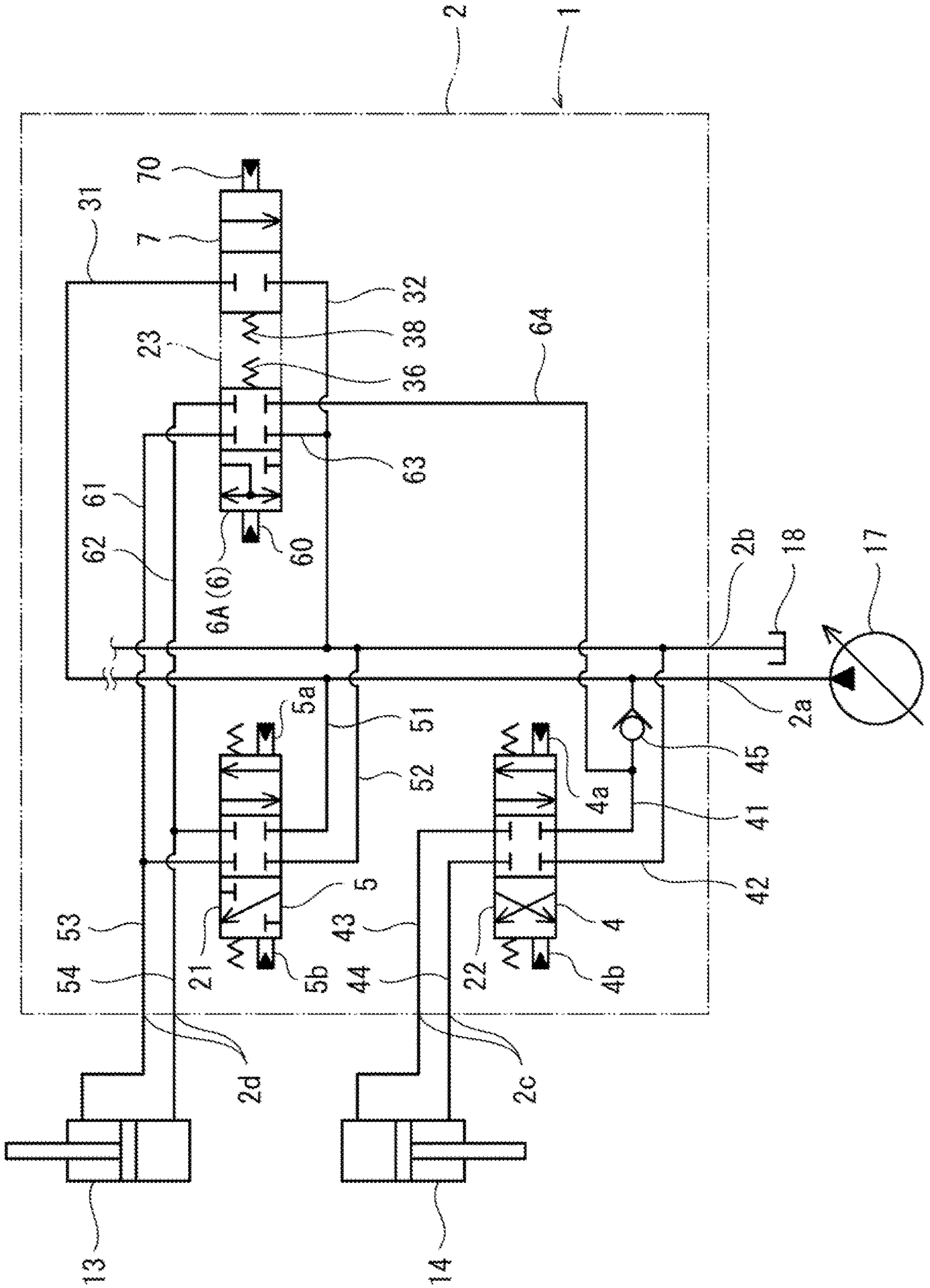
FIG. 1 shows a schematic configuration of a multi-control valve according to one embodiment of the present disclosure, and shows a hydraulic circuit in the case of using a boom recycling spool.
Figure 2:
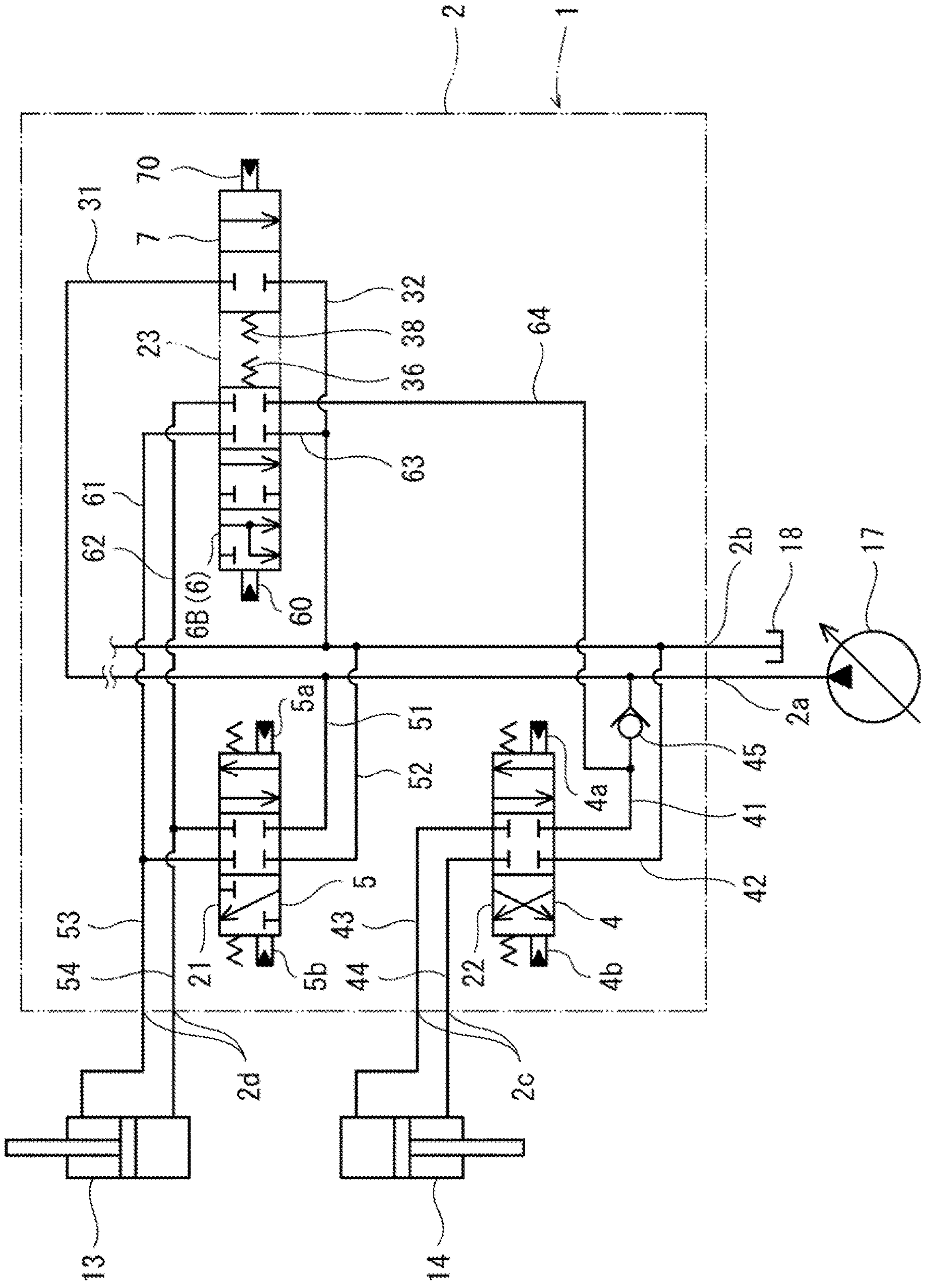
FIG. 2 shows a schematic configuration of the multi-control valve, and shows a hydraulic circuit in the case of using a boom regeneration spool.

FIG. 1 and FIG. 2 show a multi-control valve 1 according to one embodiment of the present disclosure. The multi-control valve 1 is used in a hydraulic excavator 10 shown in FIG. 3. The multi-control valve 1 is connected to a hydraulic pump 17, a tank 18, and hydraulic actuators, and forms a hydraulic circuit together with them. FIG. 1 shows the hydraulic circuit in a case where a below-described boom recycling spool 6A is used as a below-described boom sub spool 6, and FIG. 2 shows the hydraulic circuit in a case where a below-described boom regeneration spool 6B is used as the boom sub spool 6.

Figure 3:
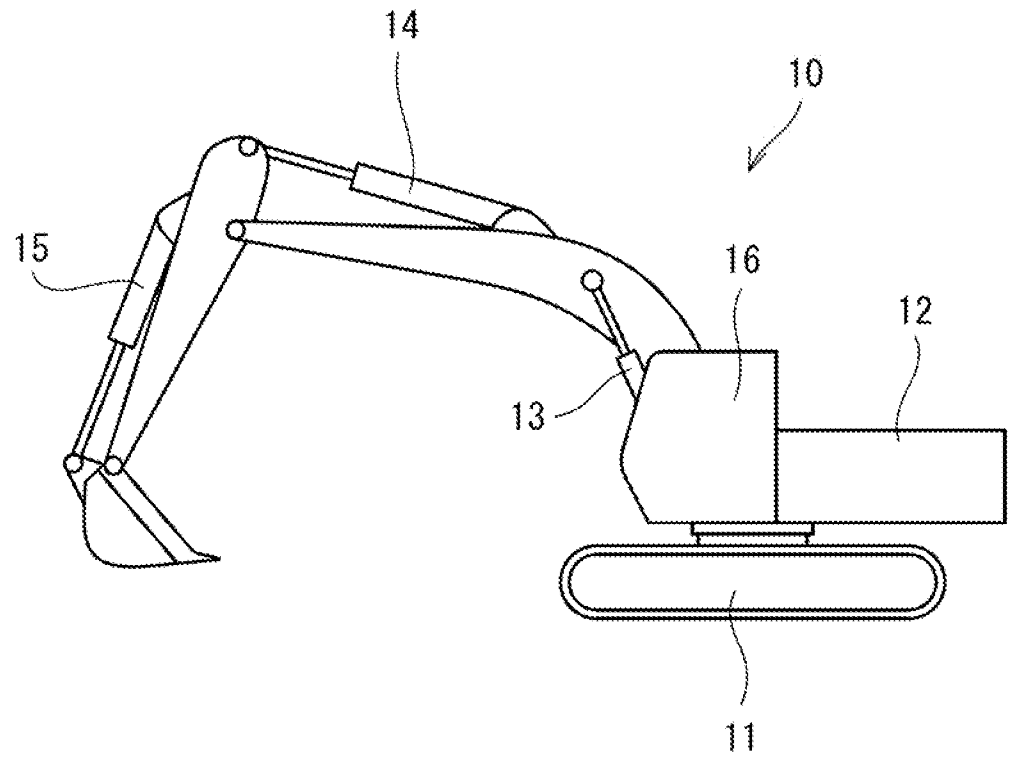
FIG. 3 is a side view of a hydraulic excavator.

The hydraulic excavator 10 shown in FIG. 3 is a self-propelled hydraulic excavator, and includes a traveling structure 11. The hydraulic excavator 10 further includes a slewing structure 12 and a boom. The slewing structure 12 is slewably supported by the traveling structure 11. The boom is luffable relative to the slewing structure 12. An arm is swingably coupled to the distal end of the boom, and a bucket is swingably coupled to the distal end of the arm. The slewing structure 12 includes a cabin 16. The cabin 16 includes a driver's seat. The hydraulic excavator 10 need not be of a self-propelled type.

The hydraulic excavator 10 includes a boom cylinder 13, an arm cylinder 14, and a bucket cylinder 15 as hydraulic actuators. The boom cylinder 13 luffs the boom. The arm cylinder 14 swings the arm. The bucket cylinder 15 swings the bucket. Although not illustrated, the hydraulic excavator 10 further includes a left travel motor, a right travel motor, and a slewing motor as hydraulic actuators. The left travel motor and the right travel motor drive the left crawler and the right crawler of the traveling structure 11, respectively. The slewing motor slews the slewing structure 12.

In FIG. 1 and FIG. 2, the illustration of the hydraulic actuators other than the boom cylinder 13 and the arm cylinder 14 is omitted for the purpose of simplifying the drawings. Also, hereinafter, the description of configurations for driving the parts other than the boom and the arm is omitted.

The multi-control valve 1 includes: a boom driving spool 5; an arm driving spool 4; and a housing 2, which slidably holds the boom driving spool 5 and the arm driving spool 4. The housing 2 includes: a first slide hole 21, which receives the boom driving spool 5 therein; and a second slide hole 22, which receives the arm driving spool 4 therein. The illustration of these slide holes in sectional views is omitted.

The housing 2 includes a pump port 2*a* and a tank port 2*b*. The pump port 2*a* is connected to the hydraulic pump 17 by piping, and the tank port 2*b* is connected to the tank 18 by piping.

The housing 2 further includes a pair of boom supply/discharge ports 2*d* and a pair of arm supply/discharge ports 2*c*. The boom supply/discharge ports 2*d* are connected to the boom cylinder 13 by piping, and the arm supply/discharge ports 2*c* are connected to the arm cylinder 14 by piping.

Figure 4:
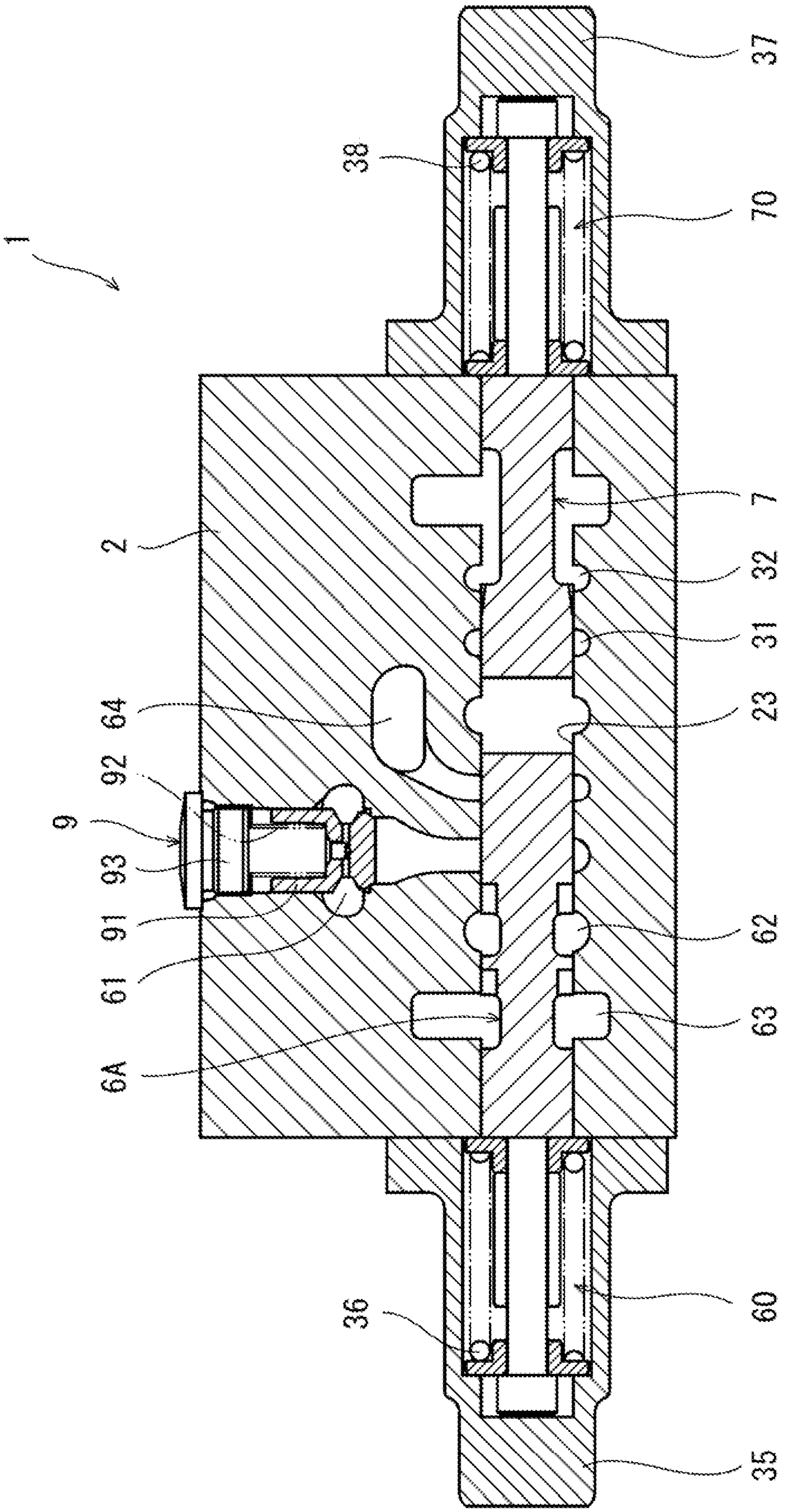
FIG. 4 is a sectional view of the multi-control valve in the case of using the boom recycling spool.
Figure 5:
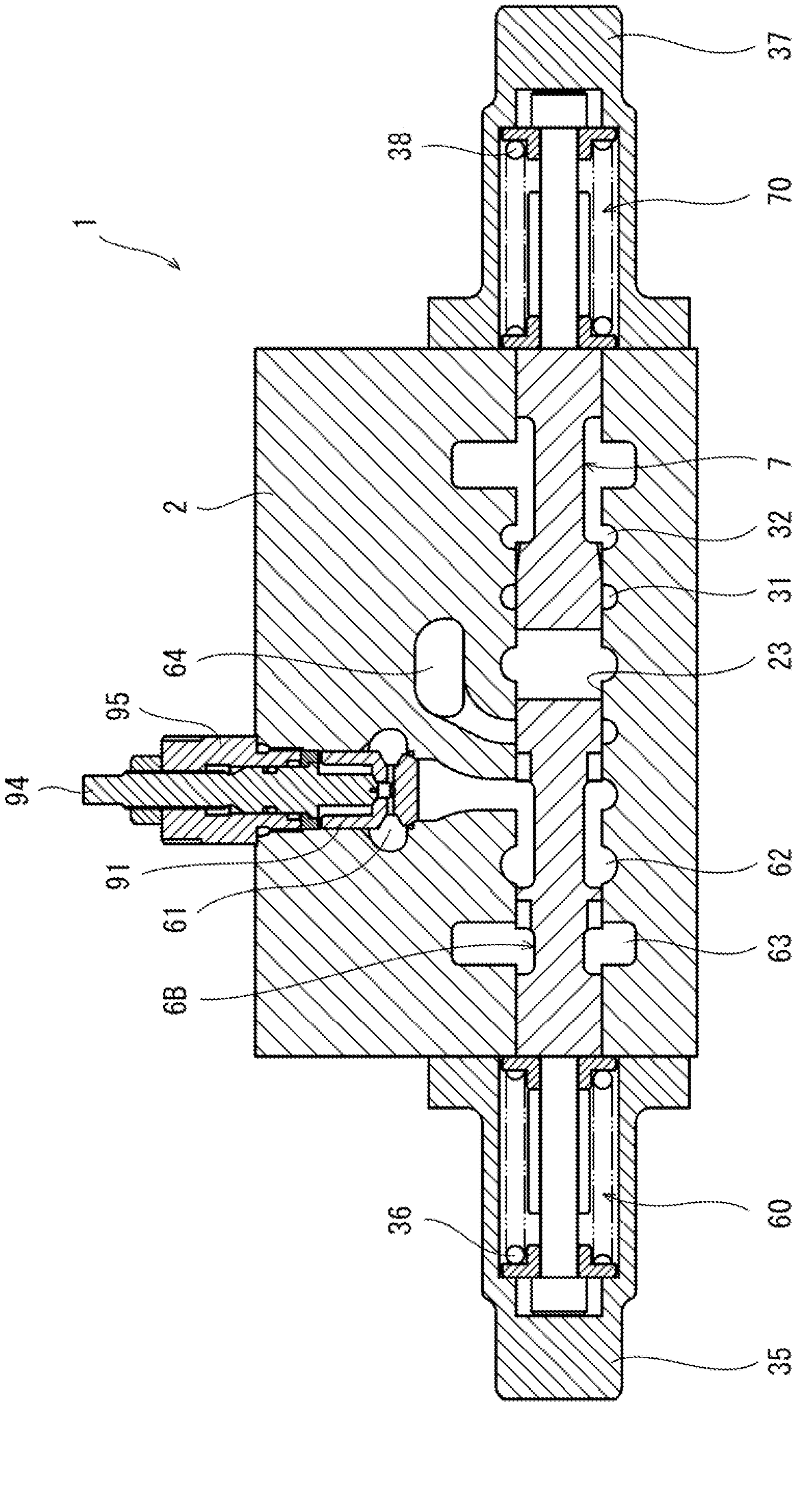
FIG. 5 is a sectional view of the multi-control valve in the case of using the boom regeneration spool.

In the present embodiment, the multi-control valve 1 further includes an unloading spool 7. As shown in FIG. 4 and FIG. 5, the unloading spool 7 is received in a third slide hole 23 included in the housing 2. That is, the unloading spool 7 is slidably held by the housing 2.

As shown in FIG. 1 and FIG. 2, the housing 2 includes a pump passage 31 and a tank passage 32. The pump passage 31 extends from the pump port 2*a* to the third slide hole 23. The tank passage 32 extends from the tank port 2*b* to the third slide hole 23.

A boom parallel passage 51 and an arm parallel passage 41 are branched off from the pump passage 31. The boom parallel passage 51 extends to the first slide hole 21, and the arm parallel passage 41 extends to the second slide hole 22. The housing 2 further includes a boom tank passage 52 and an arm tank passage 42. The boom tank passage 52 extends from the first slide hole 21 to the tank passage 32. The arm tank passage 42 extends from the second slide hole 22 to the tank passage 32.

The housing 2 further includes a boom raising supply passage 54, a boom lowering supply passage 53, an arm crowding supply passage 43, and an arm pushing supply passage 44. The boom raising supply passage 54 and the boom lowering supply passage 53 extend from the boom supply/discharge ports 2*d* to the first slide hole 21. The arm crowding supply passage 43 and the arm pushing supply passage 44 extend from the arm supply/discharge ports 2*c* to the second slide hole 22.

The boom driving spool 5 opens and closes the boom parallel passage 51, the boom tank passage 52, the boom raising supply passage 54, and the boom lowering supply passage 53. Specifically, the boom driving spool 5 shifts between a neutral position, a boom raising position, and a boom lowering position.

When the boom driving spool 5 is at the neutral position, the boom driving spool 5 blocks the boom parallel passage 51, the boom tank passage 52, the boom raising supply passage 54, and the boom lowering supply passage 53. When the boom driving spool 5 is at the boom raising position, the boom driving spool 5 allows the boom parallel passage 51 to communicate with the boom raising supply passage 54, and allows the boom lowering supply passage 53 to communicate with the boom tank passage 52. When the boom driving spool 5 is at the boom lowering position, the boom driving spool 5 allows the boom parallel passage

51 to communicate with the boom lowering supply passage 53, but blocks the boom raising supply passage 54 and the boom tank passage 52.

In the present embodiment, the boom driving spool 5 is driven by a pilot pressure. Alternatively, the boom driving spool 5 may be coupled to an electric actuator and driven by the electric actuator.

To be more specific, one end surface and the other end surface of the boom driving spool 5 face a first pilot chamber 5*a* and a second pilot chamber 5*b*, respectively. When a pilot pressure introduced into the first pilot chamber 5*a* increases, the boom driving spool 5 shifts from the neutral position to the boom raising position, whereas when a pilot pressure introduced into the second pilot chamber 5*b* increases, the boom driving spool 5 shifts from the neutral position to the boom lowering position. Also, when the boom driving spool 5 is at the boom raising position, an opening area between the boom parallel passage 51 and the boom raising supply passage 54 increases in accordance with increase in the pilot pressure introduced into the first pilot chamber 5*a*, whereas when the boom driving spool 5 is at the boom lowering position, an opening area between the boom parallel passage 51 and the boom lowering supply passage 53 increases in accordance with increase in the pilot pressure introduced into the second pilot chamber 5*b*.

The arm driving spool 4 opens and closes the arm parallel passage 41, the arm tank passage 42, the arm crowding supply passage 43, and the arm pushing supply passage 44. Specifically, the arm driving spool 4 shifts between a neutral position, an arm crowding position, and an arm pushing position.

When the arm driving spool 4 is at the neutral position, the arm driving spool 4 blocks the arm parallel passage 41, the arm tank passage 42, the arm crowding supply passage 43, and the arm pushing supply passage 44. When the arm driving spool 4 is at the arm crowding position, the arm driving spool 4 allows the arm parallel passage 41 to communicate with the arm crowding supply passage 43, and allows the arm pushing supply passage 44 to communicate with the arm tank passage 42. When the arm driving spool 4 is at the arm pushing position, the arm driving spool 4 allows the arm parallel passage 41 to communicate with the arm pushing supply passage 44, and allows the arm crowding supply passage 43 to communicate with the arm tank passage 42.

In the present embodiment, the arm driving spool 4 is driven by a pilot pressure. Alternatively, the arm driving spool 4 may be coupled to an electric actuator and driven by the electric actuator.

To be more specific, one end surface and the other end surface of the arm driving spool 4 face a first pilot chamber 4*a* and a second pilot chamber 4*b*, respectively. When a pilot pressure introduced into the first pilot chamber 4*a* increases, the arm driving spool 4 shifts from the neutral position to the arm crowding position, whereas when a pilot pressure introduced into the second pilot chamber 4*b* increases, the arm driving spool 4 shifts from the neutral position to the arm pushing position. Also, when the arm driving spool 4 is at the arm crowding position, an opening area between the arm parallel passage 41 and the arm crowding supply passage 43 increases in accordance with increase in the pilot pressure introduced into the first pilot chamber 4*a*, whereas when the arm driving spool 4 is at the arm pushing position, an opening area between the arm parallel passage 41 and the arm pushing supply passage 44 increases in accordance with increase in the pilot pressure introduced into the second pilot chamber 4*b*.

The aforementioned unloading spool 7 is intended for adjusting an opening area between the pump passage 31 and the tank passage 32. The unloading spool 7 shifts between a neutral position and an open position. When the unloading spool 7 is at the neutral position, the unloading spool 7 blocks between the pump passage 31 and the tank passage 32. When the unloading spool 7 is at the open position, the unloading spool 7 allows the pump passage 31 to communicate with the tank passage 32.

In the present embodiment, the unloading spool 7 is driven by a pilot pressure. Alternatively, the unloading spool 7 may be coupled to an electric actuator and driven by the electric actuator.

More specifically, as shown in FIG. 4 and FIG. 5, one end surface of the unloading spool 7 faces a pilot chamber 70. When a pilot pressure introduced into the pilot chamber 70 increases, the unloading spool 7 shifts from the neutral position to the open position. Also, an opening area between the pump passage 31 and the tank passage 32 increases in accordance with increase in the pilot pressure introduced into the pilot chamber 70.

In FIG. 4 and FIG. 5, a container-shaped cover 37 mounted to the housing 2 forms the pilot chamber 70. A spring 38 to keep the unloading spool 7 at its neutral position is located in the cover 37.

Further, in the present embodiment, the boom sub spool 6 is received in the third slide hole 23. That is, the boom sub spool 6 is slidably held by the housing 2. The boom sub spool 6 is either the boom recycling spool 6A shown in FIG. 1 and FIG. 4 or the boom regeneration spool 6B shown in FIG. 2 and FIG. 5.

The housing 2 includes a head-side passage 62 and a rod-side passage 61. The head-side passage 62 is branched off from the boom raising supply passage 54, and extends to the third slide hole 23. The rod-side passage 61 is branched off from the boom lowering supply passage 53, and extends to the third slide hole 23. The housing 2 further includes a recycling/regeneration tank passage 63 and a regeneration passage 64. The recycling/regeneration tank passage 63 extends from the third slide hole 23 to the tank passage 32. The regeneration passage 64 extends from the third slide hole 23 to the arm parallel passage 41.

On the arm parallel passage 41, a check valve 45 is located upstream of a connection position where the regeneration passage 64 is connected to the arm parallel passage 41 (i.e., located at the pump side with respect to the connection position). The check valve 45 allows a flow from the pump passage 31 toward the second slide hole 22, but prevents the reverse flow.

As shown in FIG. 1, the boom recycling spool 6A shifts between a neutral position and a recycling position. When the boom recycling spool 6A is at the neutral position, the boom recycling spool 6A blocks between the head-side passage 62 and the rod-side passage 61. When the boom recycling spool 6A is at the recycling position, the boom recycling spool 6A allows the head-side passage 62 to communicate with the rod-side passage 61. In the present embodiment, when the boom recycling spool 6A is at the recycling position, the head-side passage 62 communicates also with the recycling/regeneration tank passage 63.

In the present embodiment, the boom recycling spool 6A is driven by a pilot pressure. Alternatively, the boom recycling spool 6A may be coupled to an electric actuator and driven by the electric actuator.

More specifically, as shown in FIG. 4, one end surface of the boom recycling spool 6A faces a pilot chamber 60. When a pilot pressure introduced into the pilot chamber 60 increases, the boom recycling spool 6A shifts from the neutral position to the recycling position. Also, an opening area between the head-side passage 62 and the rod-side passage 61 increases in accordance with increase in the pilot pressure introduced into the pilot chamber 60.

In FIG. 4, a container-shaped cover 35 mounted to the housing 2 forms the pilot chamber 60. A spring 36 to keep the boom recycling spool 6A at its neutral position is located in the cover 35.

As described above, when the boom driving spool 5 is at the boom lowering position, the boom driving spool 5 blocks the boom tank passage 52. Accordingly, in the case of using the boom recycling spool 6A, the boom recycling spool 6A shifts in the same manner as the boom driving spool 5 at boom lowering.

In FIG. 4, a check valve 9 is located on the rod-side passage 61 (the illustration of the check valve 9 is omitted in FIG. 1). The check valve 9 allows a flow from the head-side passage 62 toward the rod-side passage 61, but prevents the reverse flow. Specifically, the check valve 9 includes: a poppet 91 slidably held by the housing 2; a lid 93 fixed to the housing 2; and a spring 92 located between the poppet 91 and the lid 93.

As shown in FIG. 2, the boom regeneration spool 6B shifts between a neutral position and a regeneration position. When the boom regeneration spool 6B is at the neutral position, the boom regeneration spool 6B blocks between the head-side passage 62 and the regeneration passage 64. When the boom regeneration spool 6B is at the regeneration position, the boom regeneration spool 6B allows the head-side passage 62 to communicate with the regeneration passage 64.

In the present embodiment, the boom regeneration spool 6B is driven by a pilot pressure. Alternatively, the boom regeneration spool 6B may be driven by an electric actuator.

To be more specific, as shown in FIG. 5, one end surface of the boom regeneration spool 6B faces the pilot chamber 60, which is formed by the cover 35 as previously described, and when the pilot pressure introduced into the pilot chamber 60 increases, the boom regeneration spool 6B shifts from the neutral position to the regeneration position. Also, an opening area between the head-side passage 62 and the regeneration passage 64 increases in accordance with increase in the pilot pressure introduced into the pilot chamber 60. As shown in FIG. 2, when the pilot pressure introduced into the pilot chamber 60 exceeds a setting value, the head-side passage 62 communicates also with the recycling/regeneration tank passage 63. The spring 36 located in the cover 35 serves to keep the boom regeneration spool 6B at its neutral position.

As described above, when the boom driving spool 5 is at the boom lowering position, the boom driving spool blocks the boom tank passage 52. Accordingly, in the case of using the boom regeneration spool 6B, the boom regeneration spool 6B shifts in the same manner as the boom driving spool 5 at boom lowering.

In FIG. 5, instead of the spring 92 and the lid 93, components such as a holder 94 and a fixer 95 are adopted so as to constantly close the rod-side passage 61 by utilizing the poppet 91 of the check valve 9.

According to the multi-control valve 1 configured as above, insertion of the boom recycling spool 6A in the third slide hole 23 makes boom recycling possible, and insertion of the boom regeneration spool 6B in the third slide hole 23 makes boom regeneration possible. That is, a hydraulic circuit capable of boom recycling can be realized by using the boom recycling spool 6A as the boom sub spool 6, and a hydraulic circuit capable of boom regeneration can be realized by using the boom regeneration spool 6B as the boom sub spool 6. Thus, compatibility with both the hydraulic circuit capable of boom recycling and the hydraulic circuit capable of boom regeneration can be realized without requiring replacement of the multi-control valve 1, but by replacing the boom sub spool 6 without replacing the housing 2.

(Variations)

The present disclosure is not limited to the above-described embodiment. Various modifications can be made without departing from the scope of the present disclosure.

For example, the boom recycling spool 6A and the boom regeneration spool 6B need not be received in the slide hole that receives the unloading spool 7 therein, but may be received in a different slide hole. However, in the case of adopting the configuration of the above-described embodiment, the housing 2 can be reduced in size compared to a case where the housing 2 includes a slide hole that receives the unloading spool 7 therein and another slide hole that receives the boom recycling spool 6A or the boom regeneration spool 6B therein. Thus, adopting the configuration of the above-described embodiment makes it possible to provide the multi-control valve 1 with a reduced cost.

Further, the multi-control valve 1 need not include the unloading spool 7.

(Summary)

A multi-control valve according to the present disclosure is a multi-control valve used in a hydraulic excavator, the multi-control valve including: an arm driving spool; a boom driving spool; a boom sub spool; and a housing that slidably holds the arm driving spool, the boom driving spool, and the boom sub spool. The housing includes: an arm parallel passage, an arm crowding supply passage, and an arm pushing supply passage that are opened and closed by the arm driving spool; a boom parallel passage, a boom raising supply passage, and a boom lowering supply passage that are opened and closed by the boom driving spool; a slide hole that receives the boom sub spool therein; a head-side passage that is branched off from the boom raising supply passage and extends to the slide hole; a rod-side passage that is branched off from the boom lowering supply passage and extends to the slide hole; and a regeneration passage that extends from the slide hole to the arm parallel passage. The boom sub spool is either a boom recycling spool or a boom regeneration spool. The boom recycling spool is a spool that shifts between a neutral position at which the boom recycling spool blocks between the head-side passage and the rod-side passage and a recycling position at which the boom recycling spool allows the head-side passage to communicate with the rod-side passage. The boom regeneration spool is a spool that shifts between a neutral position at which the boom regeneration spool blocks between the head-side passage and the regeneration passage and a regeneration position at which the boom regeneration spool allows the head-side passage to communicate with the regeneration passage.

According to the above configuration, insertion of the boom recycling spool in the slide hole makes boom recycling possible, and insertion of the boom regeneration spool in the slide hole makes boom regeneration possible. Thus, compatibility with both a hydraulic circuit capable of boom recycling and a hydraulic circuit capable of boom regeneration can be realized without requiring replacement of the multi-control valve, but by replacing the boom sub spool without replacing the housing.

The housing may include: a pump port; a tank port; a pump passage that extends from the pump port to the slide hole; and a tank passage that extends from the tank port to the slide hole. The arm parallel passage and the boom parallel passage may be branched off from the pump passage. An unloading spool to adjust an opening area between the pump passage and the tank passage may be received in the slide hole. According to this configuration, the housing can be reduced in size compared to a case where the housing includes a slide hole that receives the unloading spool therein and another slide hole that receives the boom recycling spool or the boom regeneration spool therein. Thus, this configuration makes it possible to provide the multi-control valve with a reduced cost.

For example, the housing may include a boom tank passage and an arm tank passage. The boom driving spool may shift between a neutral position, a boom raising position, and a boom lowering position. The boom raising position may be a position at which the boom driving spool allows the boom parallel passage to communicate with the boom raising supply passage, and allows the boom lowering supply passage to communicate with the boom tank passage. The boom lowering position may be a position at which the boom driving spool allows the boom parallel passage to communicate with the boom lowering supply passage, but blocks the boom raising supply passage.

The invention claimed is:

1. A multi-control valve used in a hydraulic excavator, the multi-control valve comprising:
- an arm driving spool;
- a boom driving spool;
- a boom sub spool; and
- a housing that slidably holds the arm driving spool, the boom driving spool, and the boom sub spool, wherein
- the housing includes:
  - an arm parallel passage, an arm crowding supply passage, and an arm pushing supply passage that are opened and closed by the arm driving spool;
  - a boom parallel passage, a boom raising supply passage, and a boom lowering supply passage that are opened and closed by the boom driving spool;
  - a slide hole that receives the boom sub spool therein;
  - a head-side passage that is branched off from the boom raising supply passage and extends to the slide hole;
  - a rod-side passage that is branched off from the boom lowering supply passage and extends to the slide hole; and
  - a regeneration passage that extends from the slide hole to the arm parallel passage, and
- the boom sub spool is either a boom recycling spool or a boom regeneration spool,
  - the boom recycling spool being a spool that shifts between a neutral position at which the boom recycling spool blocks communication between the head-side passage and the rod-side passage and a recycling position at which the boom recycling spool allows the head-side passage to communicate with the rod-side passage,
  - the boom regeneration spool being a spool that shifts between a neutral position at which the boom regeneration spool blocks communication between the head-side passage and the regeneration passage and a regeneration position at which the boom regeneration spool allows the head-side passage to communicate with the regeneration passage.

2. The multi-control valve according to claim 1, wherein the housing includes:
- a pump port;
- a tank port;
- a pump passage that extends from the pump port to the slide hole; and
- a tank passage that extends from the tank port to the slide hole, the arm parallel passage and the boom parallel passage are branched off from the pump passage, and an unloading spool to adjust an opening area between the pump passage and the tank passage is received in the slide hole.

3. The multi-control valve according to claim 2, wherein the housing includes a boom tank passage and an arm tank passage, and the boom driving spool shifts between a neutral position, a boom raising position, and a boom lowering position,
- the boom raising position being a position at which the boom driving spool allows the boom parallel passage to communicate with the boom raising supply passage, and allows the boom lowering supply passage to communicate with the boom tank passage,
- the boom lowering position being a position at which the boom driving spool allows the boom parallel passage to communicate with the boom lowering supply passage, but blocks the boom raising supply passage.

4. The multi-control valve according to claim 1, wherein the housing includes a boom tank passage and an arm tank passage, and the boom driving spool shifts between a neutral position, a boom raising position, and a boom lowering position,
- the boom raising position being a position at which the boom driving spool allows the boom parallel passage to communicate with the boom raising supply passage, and allows the boom lowering supply passage to communicate with the boom tank passage,
- the boom lowering position being a position at which the boom driving spool allows the boom parallel passage to communicate with the boom lowering supply passage, but blocks the boom raising supply passage.

* * * * *